United States Patent
Sundareswara et al.

(10) Patent No.: US 12,333,865 B2
(45) Date of Patent: Jun. 17, 2025

(54) AUTOMATED PREDICTION OF REPAIR BASED ON SENSOR DATA

(71) Applicant: THE BOEING COMPANY, Chicago, IL (US)

(72) Inventors: Rashmi Sundareswara, Topanga, CA (US); Franz D. Betz, Renton, WA (US); Tsai-Ching Lu, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 496 days.

(21) Appl. No.: 17/461,306

(22) Filed: Aug. 30, 2021

(65) Prior Publication Data
US 2022/0068042 A1 Mar. 3, 2022

Related U.S. Application Data

(60) Provisional application No. 63/072,292, filed on Aug. 31, 2020.

(51) Int. Cl.
*G07C 5/00* (2006.01)
*G06F 18/23213* (2023.01)
(Continued)

(52) U.S. Cl.
CPC ....... *G07C 5/006* (2013.01); *G06F 18/23213* (2023.01); *G06N 5/02* (2013.01);
(Continued)

(58) Field of Classification Search
CPC .... G07C 5/006; G07C 5/0808; G07C 5/0825; G06F 18/23213; G06F 18/23; G06N 5/02;
(Continued)

(56) References Cited

U.S. PATENT DOCUMENTS

2007/0288409 A1\* 12/2007 Mukherjee ............. G06N 3/045
706/25
2015/0235141 A1\* 8/2015 Rensing ............. G05B 23/0224
706/52

(Continued)

OTHER PUBLICATIONS

E. M. Ortiz, A. Babbar, V. L. Syrmos, G. J. Clark, J. L. Vian and M. M. Arita, "Multi Source Data Integration for Aircraft Health Management," 2008 IEEE Aerospace Conference, Big Sky, MT, USA, 2008, pp. 1-12, doi: 10.1109/AERO.2008.4526625. (Year: 2008).\*

(Continued)

*Primary Examiner* — Anne Marie Antonucci
*Assistant Examiner* — Jordan T Smith
(74) *Attorney, Agent, or Firm* — Harrity & Harrity, LLP

(57) ABSTRACT

An apparatus includes memory to store computer-readable program code for a knowledge-based system including an inference engine and a knowledge base, and processing circuitry configured to access the memory, and execute the code. The apparatus is caused to at least receive a time series of measurements of operating conditions of a machine recorded during an operation of the machine. The apparatus is also caused to cluster the time series of measurements into one or more respective clusters and identify a pattern across the clusters. The apparatus is also caused to define a current state of the machine that includes the pattern across the clusters, access and search a knowledge base for a historical case describing a respective solution to a historical problem state similar to the current state, the respective solution including a repair action, and generate an output display indicating the repair action to address the current state.

20 Claims, 5 Drawing Sheets

(51) Int. Cl.
  *G06N 5/02* (2023.01)
  *G06N 5/04* (2023.01)
  *G07C 5/08* (2006.01)

(52) U.S. Cl.
  CPC ............. *G06N 5/04* (2013.01); *G07C 5/0808* (2013.01); *G07C 5/0825* (2013.01)

(58) Field of Classification Search
  CPC .. G06N 5/04; G06N 5/01; G06N 7/01; G06N 20/00; G06V 10/82; G05B 2219/24019; G05B 23/0281; G05B 2219/45071; B64F 5/60
  See application file for complete search history.

(56) References Cited

U.S. PATENT DOCUMENTS

| | | | | |
|---|---|---|---|---|
| 2016/0257429 | A1* | 9/2016 | Szeto | B64F 5/60 |
| 2017/0083830 | A1* | 3/2017 | Bates | G05B 23/0229 |
| 2017/0293862 | A1* | 10/2017 | Kamiya | G01N 29/4436 |
| 2018/0165894 | A1* | 6/2018 | Martin | G07C 5/08 |
| 2019/0180527 | A1* | 6/2019 | Segal | G06N 20/00 |
| 2019/0379589 | A1* | 12/2019 | Ryan | G06F 17/142 |
| 2020/0379454 | A1* | 12/2020 | Trinh | G05B 23/024 |
| 2020/0391884 | A1* | 12/2020 | Hawley | B64F 5/60 |
| 2021/0192860 | A1* | 6/2021 | Kale | G06N 3/08 |
| 2021/0335059 | A1* | 10/2021 | Dixit | G05B 23/0254 |

OTHER PUBLICATIONS

Z. Wang, J.-L. Zarader and S. Argentieri, "A novel aircraft fault diagnosis and prognosis system based on Gaussian Mixture Models," 2012 12th International Conference on Control Automation Robotics & Vision (ICARCV), Guangzhou, China, 2012, pp. 1794-1799, doi: 10.1109/ICARCV.2012.6485422. (Year: 2012).*

F. Forest, J. Lacaille, M. Lebbah and H. Azzag, "A Generic and Scalable Pipeline for Large-Scale Analytics of Continuous Aircraft Engine Data," 2018 IEEE International Conference on Big Data (Big Data), Seattle, WA, USA, 2018, pp. 1918-1924, doi: 10.1109/BigData.2018.8622297. (Year: 2016).*

* cited by examiner

AUTOMATED PREDICTION OF REPAIR BASED ON SENSOR DATA

CROSS-REFERENCE TO RELATED APPLICATION(S)

This application claims priority to U.S. Provisional Application No. 63/072,292, filed Aug. 31, 2020, entitled AUTOMATED PREDICTION OF REPAIR BASED ON SENSOR DATA, which is related to U.S. patent application Ser. No. 15/966,188, filed Apr. 18, 2018, entitled DETECTING FAULT STATES OF AN AIRCRAFT, the content of each of which is incorporated herein by reference in its entirety.

TECHNOLOGICAL FIELD

The present disclosure relates generally to machine diagnosis and repair, and in particular, to automated prediction of repair based on sensor data.

BACKGROUND

Machines including as vehicles such as aircraft, spacecraft, watercraft, motor vehicles, railed vehicles, typically include some type of performance monitoring system that records data regarding the machine performance, which includes the performance of the various systems (and subsystems) of the machine. The data include a record of certain performance events that occur during the operation of the machine. The performance monitoring system typically conducts data collection and reports all of the data collected to the user. The user then may utilize the data in determining the type of maintenance or repair, if any, that the machine may need. For example, if the data indicates that a particular mechanical or electromechanical system of the machine is malfunctioning or that the performance of one or more mechanical or electromechanical systems may contribute to a future machine failure, then the user can perform the appropriate repair on the machine at the next opportunity.

While the current systems for machine performance and fault monitoring provide the necessary data for a user to make an appropriate repair decision, it is still necessary for a user to sort through all of the data to determine the most-appropriate repair action to address a fault mode. Thus, the user must sort and interpret the data in light of the user's knowledge of the particular machine. This can be time consuming and not always result in the first performed repair action being the most appropriate repair action, particularly for complex machines like aircraft and other vehicles. For many types of machines, particularly commercial vehicles, the amount of time the vehicle is out of service is costly to the vehicle owner. As such, the longer it takes for the most-appropriate repair action to be performed for a given fault mode, the longer the vehicle will be out of service, which may be expensive to the vehicle owner if the vehicle would otherwise be in service.

Therefore, it would be desirable to have a system and method that takes into account at least some of the issues discussed above, as well as other possible issues.

BRIEF SUMMARY

Example implementations of the present disclosure are directed to machine diagnosis and repair, and in particular, to automated prediction of repair of a machine, such as an aircraft, based on sensor data. Example implementations use historical data, measurements of operating conditions, and repair actions performed to address the current state of the machine, to recommend correct repair action. Example implementations use a knowledge-based system to search a knowledge base for a repair action from the historical data. The knowledge-based system identifies a matching or similar historical case from the current state of the machine and current and historical operating conditions, and searches for a repair action for the current state of the machine from the historical repair actions.

Example implementations provide for more-informed repair of mechanical or electromechanical systems of a machine, enabling mechanics to perform quick and correct repair actions for fault modes of those systems. In the case of aircraft, this may lead to a reduction in time aircraft are out of service, and an increase in on-schedule performance for airlines. In the defense sector, example implementations may lead to increased aircraft availability and increased mission readiness.

The present disclosure thus includes, without limitation, the following example implementations.

Some example implementations provide a method comprising: receiving a time series of measurements of a plurality of operating conditions of a machine recorded during an operation of the machine; clustering the time series of measurements into one or more respective clusters of measurements; identifying a pattern across the clusters of measurements; defining a current state of the machine that includes the pattern across the clusters of measurements; accessing a knowledge base including a set of historical cases describing historical problem states of the machine and respective solutions, the historical problem states of the machine including patterns across clusters of measurements of the plurality of operating conditions of the machine recorded during previous instances of operation of the machine during which failure modes of systems of the machine occurred, and the respective solutions including repair actions performed to address respective ones of the failure modes; searching the knowledge base for a historical case describing a respective solution to a historical problem state of the historical problem states similar to the current state, the respective solution being identified as a candidate solution to the current state, the respective solution to the historical problem state including a repair action; and generating an output display indicating the repair action to address the current state.

In some example implementations of the method of any preceding example implementation, or any combination of any preceding example implementations, the time series of measurements is clustered based on input parameters including a fixed number of clusters, a maximum distance between a center measurement and other measurements in a cluster of measurements, or a minimum number of measurements in a cluster of measurements.

In some example implementations of the method of any preceding example implementation, or any combination of any preceding example implementations, the time series of measurements is clustered into a fixed number of clusters according to a clustering algorithm or a set of clustering algorithms including a k-means clustering algorithm, a Density Based Spatial Clustering of Applications with Noise (DBSCAN) algorithm, or a Dirichlet Process Gaussian Mixture Model (DPGMM) algorithm.

In some example implementations of the method of any preceding example implementation, or any combination of any preceding example implementations, the machine is a vehicle, the systems include vehicle systems, and receiving the time series of measurements further comprises receiving fault data from a vehicle system of the vehicle systems, recorded during the operation that is or includes a trip of the vehicle, and the method further comprises diagnosing the current state that is a failure mode of the vehicle system or another of the vehicle systems, from the fault data.

In some example implementations of the method of any preceding example implementation, or any combination of any preceding example implementations, diagnosing the current state includes diagnosing a timing of the failure mode, and the method further comprises: identifying the plurality of operating conditions as related to the failure mode, wherein the plurality of operating conditions is a subset of a greater plurality of operating conditions of the vehicle; identifying a time interval from the timing of the failure mode; and extracting the time series of measurements from a greater time series of measurements of the greater plurality of operating conditions, and for the time interval.

In some example implementations of the method of any preceding example implementation, or any combination of any preceding example implementations, repair actions in the knowledge base are weighted based on a success rate of the repair actions to address the respective ones of the failure modes, and one or more of the historical problem states of one or more of the historical cases match or are within a defined margin of matching the current state, and searching the knowledge base includes selecting the historical case having a highest weighted repair action and thereby a highest success rate of the repair actions of the one or more of the historical cases.

In some example implementations of the method of any preceding example implementation, or any combination of any preceding example implementations, the machine is an aircraft, and the current state is indicated by a failure mode reported by the aircraft during the operation that is or includes a flight of the aircraft.

Some example implementations provide an apparatus comprising: memory configured to store computer-readable program code for a knowledge-based system including an inference engine and a knowledge base; and processing circuitry configured to access the memory, and execute the computer-readable program code to cause the inference engine and thereby the apparatus to at least perform the method of any preceding example implementation, or any combination of any preceding example implementations.

Some example implementations provide a computer-readable storage medium comprising: computer-readable program code and a knowledge-based system stored therein, the knowledge-based system including an inference engine and a knowledge base, the computer readable program code, in response to execution by processing circuitry, causing the inference engine and thereby an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 4:
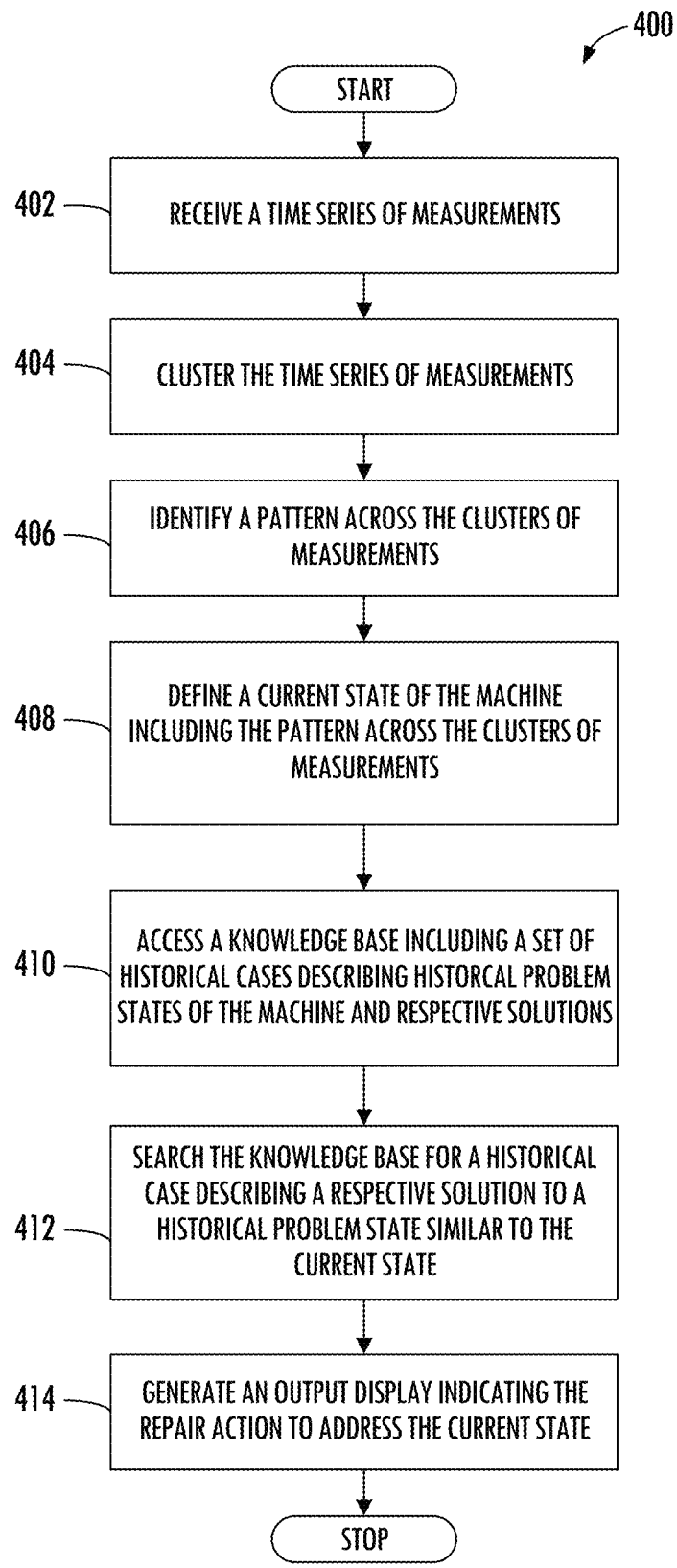
Figure 5:
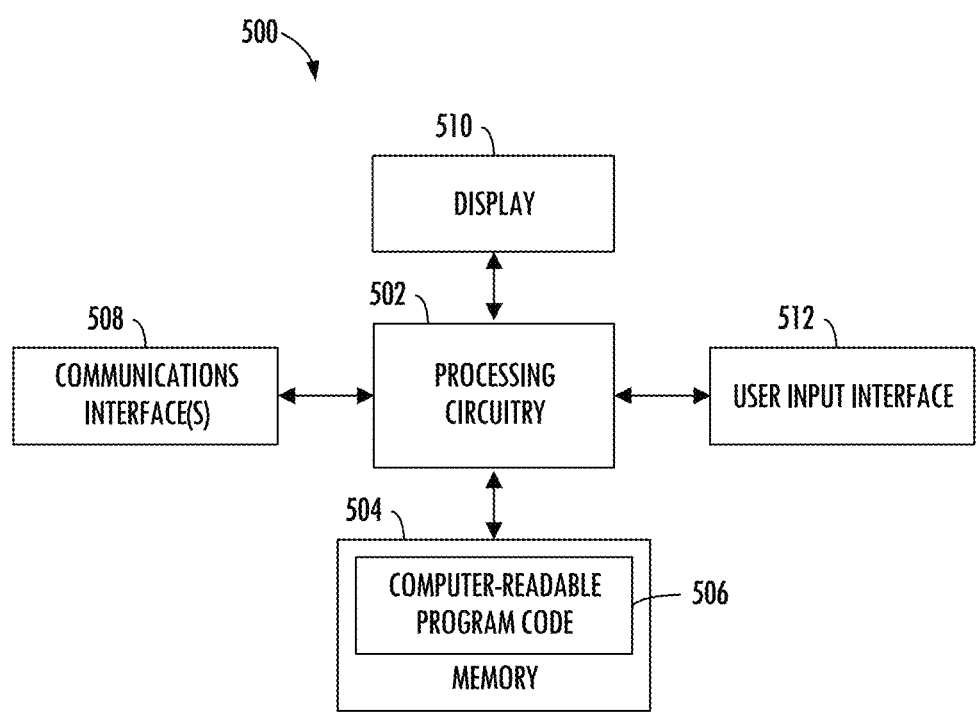

FIGS. 3A, 3B, 3C, and 3D, illustrate examples of confusion matrices for sample results of a training methodology according to example implementations;

FIG. 4 is a flowchart illustrating various steps in a method of diagnosis and repair of a mechanical or electromechanical system of a machine such as an aircraft, according to example implementations; and FIG. 5 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to machine repair and, in particular, to repair of a mechanical or electromechanical system of a machine. While example implementations will be primarily described in conjunction with repair of a mechanical or electromechanical system of an aircraft, it should be understood that example implementations may be utilized in conjunction with a variety of other machines. Examples of suitable machines that may benefit from example implementations include vehicles such as spacecraft, watercraft, motor vehicles, railed vehicles and the like. Furthermore, it should be understood that unless otherwise specified, the terms "data," "content," "digital content," "information," and similar terms may be at times used interchangeably. Similarly, the terms "maintenance" and "repair" may be at times used interchangeably.

Example implementations of the present disclosure provide for more-informed repair of mechanical or electromechanical systems of a machine such as a vehicle, which may lead to most-appropriate, first-time repair for fault modes of the respective systems. Some example implementations are premised on many cases in which each fault type is due to one or more root causes from an exhaustive list of root causes. For each specific root cause of a fault mode, operating conditions of a machine may show a fair degree of similarity. The root cause(s) of each fault occurrence may therefore be reflected in operating conditions of the machine (recorded during operation of the machine), including more particularly the operating conditions leading up to and just prior to occurrence of the fault mode.

Figure 1:
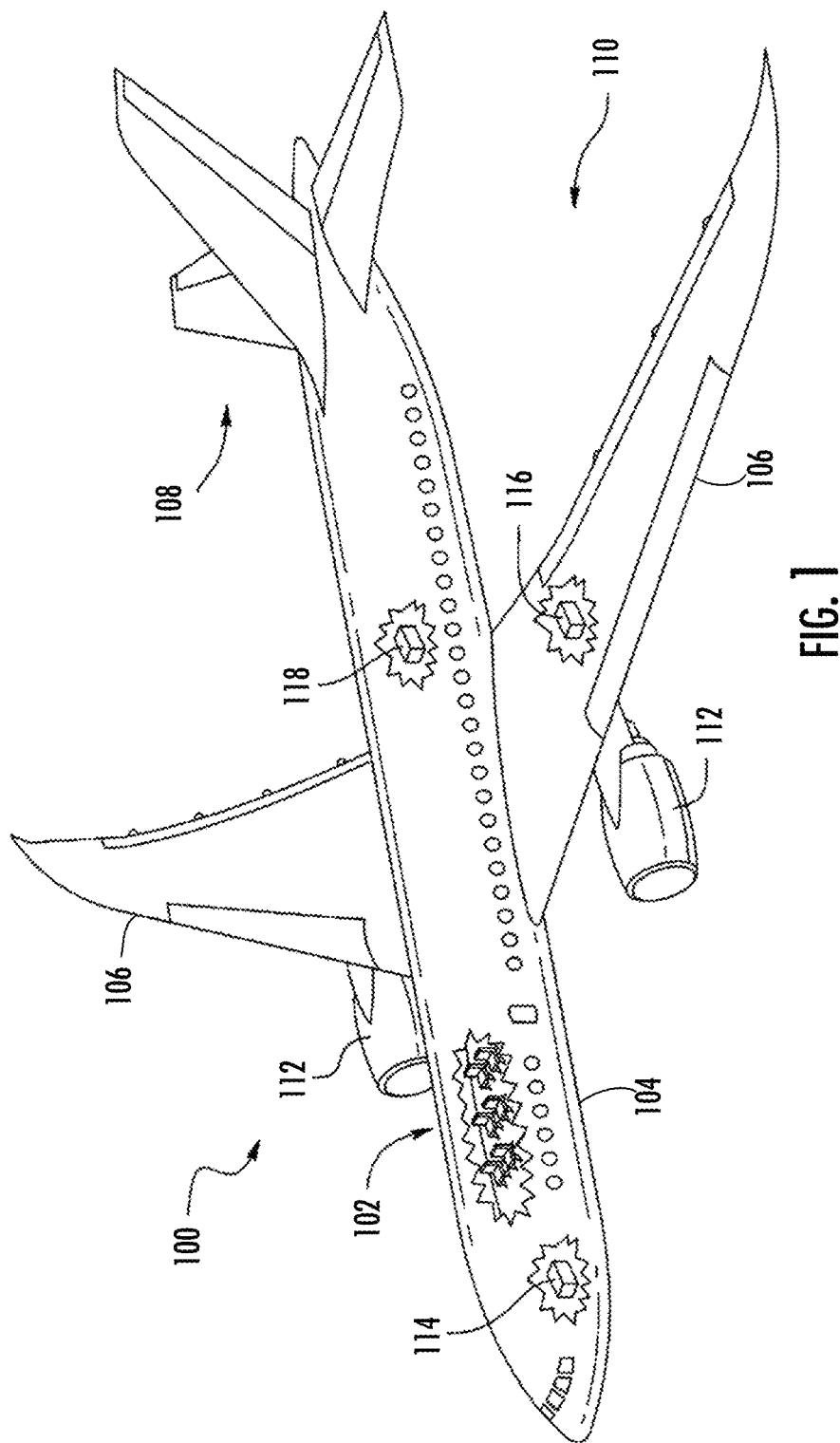
FIG. 1 illustrates an aircraft according to some example implementations of the present disclosure.

FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other examples, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
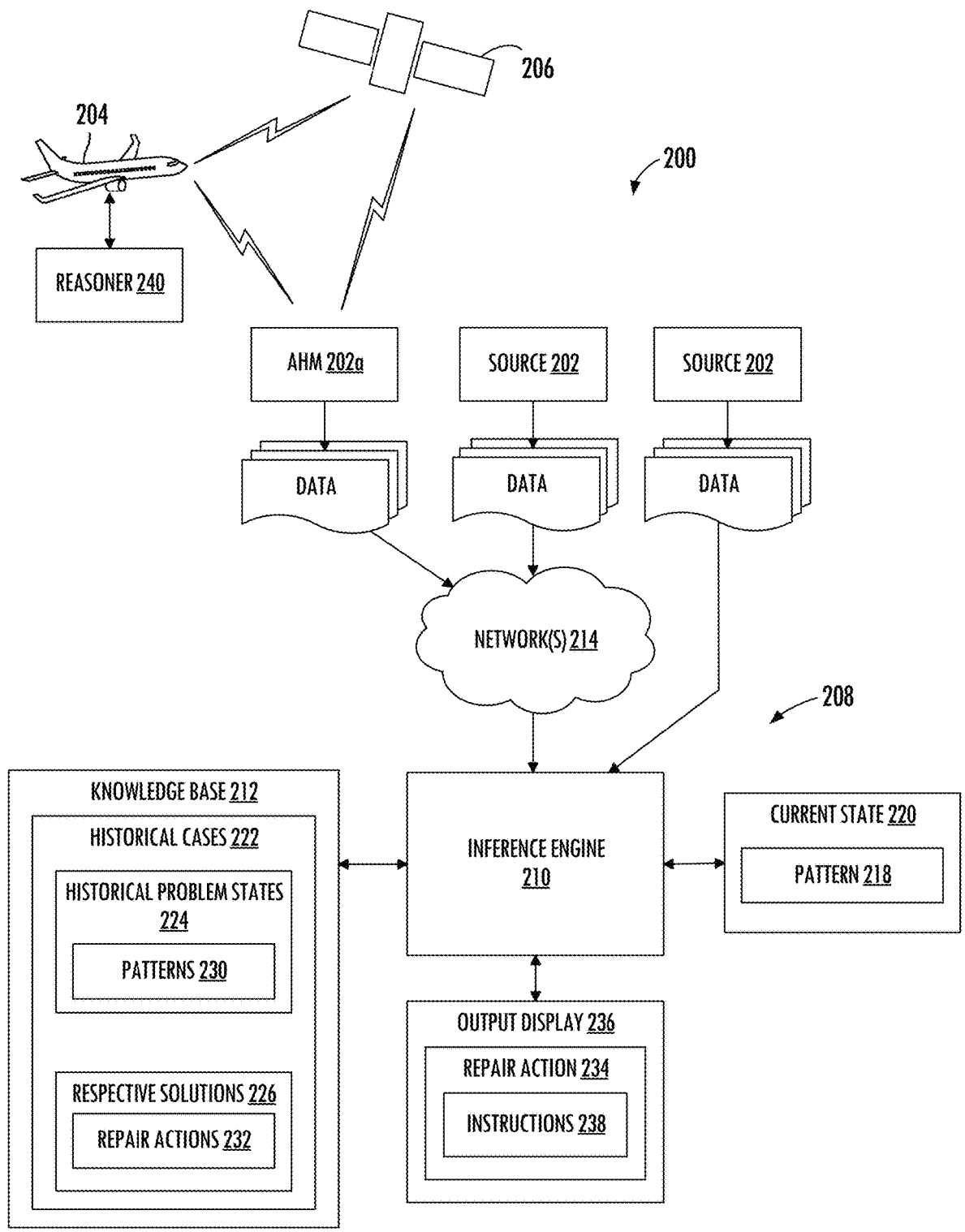
FIG. 2 illustrates a system for diagnosis and repair of a mechanical or electromechanical system of a machine such as an aircraft, according to example implementations of the present disclosure.

FIG. 2 illustrates a system 200 for repair of a machine such as vehicle (e.g., aircraft 100), which may include repair of a mechanical or electromechanical system of the machine, according to example implementations of the present disclosure. The system may include any of a number of different subsystems (each an individual system) for performing one or more functions or operations. As shown, in some examples, the system includes at least one source 202 of data. In some examples, the source includes a memory that may be located at a single source or distributed across multiple sources. The data may be stored in a number of different manners, such as in a database or files of any of a number of different types or formats (e.g., quick access recorder (QAR), enhanced airborne flight recorder (EAFR), flight data recorder (FDR), and the like).

In some examples in which the machine is an aircraft, the data includes indications of failure modes of systems of the aircraft, some of which may be indicated by flight deck effects (FDEs) reported by the aircraft. One example of a suitable failure mode is failure of the cabin air compressor (CAC) of an aircraft. The data also includes flight data for flights of an aircraft, including previous flights of the aircraft. The flight data including a time series of measurements of a plurality of operating conditions of the aircraft recorded during the flight from sensors or avionic systems onboard the aircraft. Examples of suitable operating conditions include flow, temperature, pressure, recordings from the CAC, altitude, speed, and the like.

In some more particular examples, the flight data includes the time series of measurements of the plurality of operating conditions recorded during the flight by a monitoring system from the sensors or avionic systems, and least some of the flight data for each flight is accessible from reports generated by the monitoring system. The monitoring system may be onboard the machine such as aircraft 204 that in some examples corresponds to aircraft 100. In this regard, the aircraft may be configured to record flight data and produce reports, which may be wirelessly transmitted to a particular source 202 of data—shown and at times referred to as an airplane health management (AHM) system 202a—directly or via an artificial satellite 206 or network. In yet other examples, the flight data may be transmitted via a wired connection or portable data storage device (e.g., flash memory, thumb drive).

The system 200 of example implementations of the present disclosure includes a knowledge-based system 208 to determine a repair action to address a failure mode of a mechanical or electromechanical system of the machine (e.g., aircraft 204), from at least some of the above data. The knowledge-based system includes an inference engine 210 and a knowledge base 212. The subsystems including the source(s) 202, AHM system 202a, and knowledge-based system including the inference engine and knowledge base, may be co-located or directly coupled to one another, or in some examples, various ones of the subsystems may communicate with one another across one or more computer networks 214. Further, although shown as part of the system 200, it should be understood that any one or more of the above may function or operate as a separate system without regard to any of the other subsystems. It should also be understood that the system may include one or more additional or alternative subsystems than those shown in FIG. 2.

According to some example implementations of the present disclosure, the inference engine 210 is configured to receive a time series of measurements of a plurality of operating conditions of the aircraft recorded during the flight from sensors or avionic systems onboard the aircraft. The time series of measurements includes operational data that comprises normal data and fault data. The inference engine is configured to cluster the time series of measurements into one or more respective clusters of measurements, and the inference engine is configured to identify a pattern 218 across the clusters of measurements, and define a current state 220 of the machine including (the pattern across the clusters of measurements. In some examples, depending on a clustering algorithm(s) utilized by the inference engine, the time series of measurements is clustered based on input parameters including a fixed number of clusters, a maximum distance between a center measurement and other measurements in a cluster of measurements, or a minimum number of measurements in a cluster of measurements.

In some examples, the inference engine 210 is configured to access the knowledge base 212 including a set of historical cases 222 describing historical problem states 224 and respective solutions 226. The historical problem states include patterns 230 across clusters of measurements of the plurality of operating conditions of the aircraft recorded during previous instances of operation of the machine during which failure modes of systems of the machine occurred (e.g., respective ones of the previous flights by the airborne flight recorder from the sensors or avionic systems onboard the aircraft). The respective solutions include repair actions 232 performed to address the respective ones of the failure modes. In some examples, these repair actions are extracted from maintenance logs, such as from an aviation resource management system. One example of a suitable repair action for a CAC failure may include instructions to inspect and/or repair CMSC Left 2 CAC, CMSC Right 2 CAC, or Nitrogen Generation System Motor Driven Compressor (NGS MDC).

The inference engine 210 is, in some examples, configured to search the knowledge base 212 for a historical case 222 describing a respective solution (of the respective solutions 226) to a historical problem state of the historical problem states 224 similar to the current state 220, which may be the historical problem state most similar to the current state. In this regard, the respective solution is identified as a candidate solution to the current state. In some examples, this search includes a search of the knowledge base for the historical case describing the historical problem state that includes a pattern of the patterns 230 most similar to the pattern 218 of the current state. The respective solution to the historical problem state being identified as a candidate solution to the current state includes a repair action 234 (of the repair actions 232). The inference engine, then, is configured to generate an output display 236 indicating the repair action to address the current state of the machine (e.g., aircraft 204) and/or its mechanical or electromechanical system. In some examples, the repair action references instructions 238 for performing the repair action to address the current state.

In some examples, the knowledge-based system 208 is built in a number of different manners. In this regard, historical problem states 224 of systems of the machine (e.g., aircraft 204) occurred during previous flights of the aircraft may be collected along with time series of measurements of the plurality of operating conditions of the aircraft recorded during respective ones of the previous flights, and repair actions 232 performed to address the respective ones of the failure modes. This data may be collected for multiple systems over multiple previous flights across one or more years in which information regarding the repair actions performed is available. Data analytics, natural language processing (NLP), machine learning and the like may be performed on the data to develop the inference engine 210 to identify patterns 230 across clusters of measurements of the plurality of operating conditions, which may then be stored in the knowledge base 212.

In some examples, the repair actions 232 in the knowledge base 212 are weighted based on a success rate of the repair actions to address the respective ones of the failure modes. When one or more of the historical problem states 224 of one or more of the historical cases 222 match or are within a defined margin of matching the current state 220, then, the inference engine 210 may select the historical case having a highest weighted repair action and thereby a highest success rate of the repair actions of the one or more of the historical cases.

In some examples, the system 200 further includes a reasoner, such as reasoner 240, configured to receive fault data from a system recorded during operation of the machine (e.g., an aircraft system recorded during a flight of the aircraft 204), the fault data being part of operational data that includes the fault data and normal data. In these examples, the reasoner is configured to diagnose the current state 220 of the mechanical or electromechanical system that is a failure mode of the aircraft system or another of the aircraft systems, from the fault data; the reasoner is configured to operate according to a clustering algorithm or a set of clustering algorithms including a k-means clustering algorithm, a Density Based Spatial Clustering of Applications with Noise (DB SCAN) algorithm, or a Dirichlet Process Gaussian Mixture Model (DPGMM) algorithm. As shown in FIG. 2, the reasoner is located onboard the aircraft to operate on the fault data in real-time or near real-time. In other examples, the reasoner may be off-board the aircraft and configured to communicate with others of the subsystems across the computer network(s) 214, or the reasoner may be co-located with the knowledge-based system 208. In these examples, the operational data, normal data, or fault data may be downloaded from the aircraft during flight or post flight.

In some further examples, the reasoner 240 is configured to diagnose the current state that is, or is indicated by, a failure mode of the aircraft system (mechanical or electromechanical system) or another of the aircraft systems, from the fault data—the failure mode being reported by the aircraft 204 during the operation that is or includes a flight of the aircraft. The diagnosing may be according to the clustering algorithm or set of clustering algorithms developed based on machine learning techniques. In some of these further examples, diagnosing the current state includes diagnosing a timing of the failure mode, and the reasoner is configured to identify the plurality of operating conditions as related to the failure mode. The plurality of operating conditions may be a subset of a greater plurality of operating conditions of the aircraft 204. Also in some of these further examples, the reasoner is configured to identify a time interval from the timing of the failure mode, and extract the time series of measurements from a greater time series of measurements of the greater plurality of operating conditions, and for the time interval.

As indicated above, example implementations may be utilized in conjunction with a variety of machines, including vehicles such as spacecraft, watercraft, motor vehicles, railed vehicles and the like. More generally, then, the inference engine 210 is configured to receive a time series of measurements of a plurality of operating conditions of the machine recorded during the operation. The inference engine is configured to cluster the time series of measurements into one or more respective clusters of measurements, identify a pattern 218 across the clusters of measurements, and define a current state 220 including the pattern across the clusters of measurements.

The inference engine 210 is configured to access the knowledge base 212 including a set of historical cases 222 describing historical problem states 224 and respective solutions 226. The historical problem states include patterns 230 across clusters measurements of the plurality of operating conditions of the machine recorded during previous instances of operation of the machine during which failure modes of systems of the machine occurred. The respective solutions include repair actions 232 performed to address respective ones of the failure modes.

The inference engine 210 is configured to search the knowledge base 212 for a historical case describing a respective solution to a historical problem state of the historical problem states 224 similar to the current state 220, which may be the historical problem state most similar to the current state. The respective solution is identified as a candidate solution to the current state, and the respective solution to the historical problem state includes a repair action 234. The inference engine is then configured to generate an output display 236 indicating the repair action to address the current state. In some examples, the repair action references instructions 238 for performing the repair action to address the current state.

A training methodology for the inference engine 210 may include various steps beginning with the input of sensor data as a time series of measurements, which may be compiled into a matrix. If the number of sensor data points is too large, the data may be compressed using a clustering algorithm or a set of clustering algorithms. Examples of clustering algorithms include a k-means algorithm; a k-medoids algorithm (if some of the sensor variables are binary-valued or discrete-valued); DPGMM; and/or DBSCAN. The output of the clustering algorithm(s) is states that are each represented by a value of the mean of the points in a cluster (grouping), in which the center may be referred to as a "state."

Each sensor data point may be assigned to a state (which may also be referred to as "labeling") by computing the distance between the sensor data point and each state (center of a cluster), and then assigning the sensor data point to the state for which the computed distance is the shortest. After sensor data points are assigned to states, sequences of latent states for the compressed data, or sequences of the uncompressed raw data, may be computed for n seconds in a sliding window. The size (n) of the sliding window may vary depending on the use of raw data or compressed data. In some examples, n is varied from 5 seconds to 60 seconds, but other values of n less than 5 or greater than 60 may be utilized as appropriate.

The sequences of either raw data or latent states may be compared to data including historical cases 222. In some examples, this data and/or the historical cases may comprise data containing summaries of historical repair actions related to failure modes and stored in Positive Repair Identification Text Analyzer (PRITA) software. PRITA data may be compared to the computed sequences to associate the repair actions with features present in the sequences of compressed data or raw data.

The training methodology may incorporate a supervised learning algorithm such as Random Forest, although other machine learning algorithms may be utilized (e.g., Neural Networks). Once trained, the inference engine 210 may receive inputs (data) at a window size of n and output a repair action based on and relevant to the inputs.

Figures 3A, 3B, 3C, 3D:
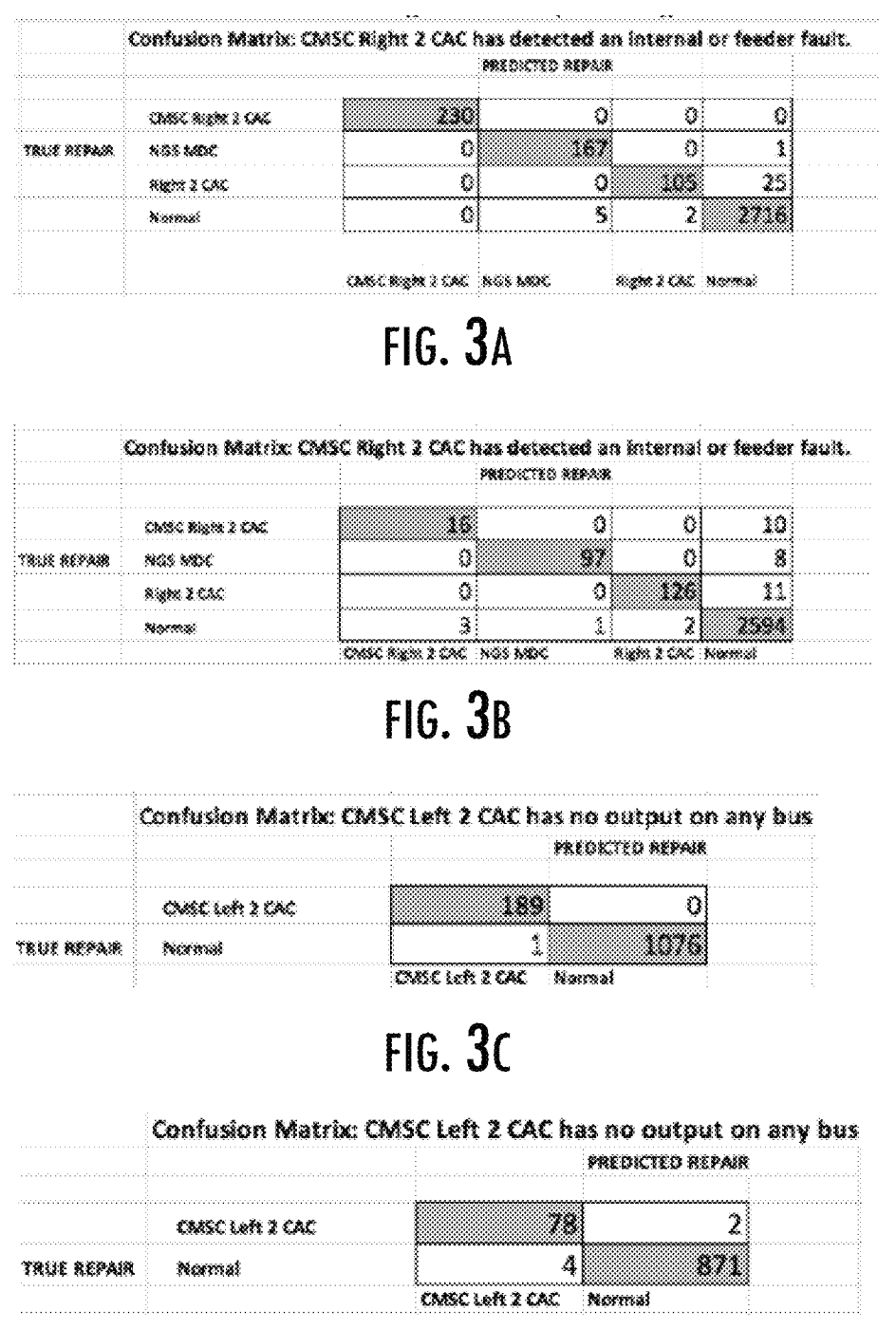

FIGS. 3A, 3B, 3C, and 3D, illustrate examples of confusion matrices for sample results of a training methodology using Random Forests, according to some example implementations. Rows in the matrices correspond to true repairs, and columns correspond to predicted repairs by an inference engine (e.g., inference engine 210). Each of FIGS. 3A-3D use examples of fault messages related to the CAC and may also refer to a Common Motor Start Controller (CMSC). FIGS. 3A and 3B show respective sample results computed for raw data and latent states related to the fault message "CMSC Right 2 CAC has detected an internal or feeder fault." The example of FIG. 3A results in a recall of about 95% and precision of about 98%, and the example of FIG. 3B results in a recall of about 89% and a precision of about 97-98%. FIGS. 3C and 3D show respective sample results computed for raw data and latent states related to the fault message "CMSC Left 2 CAC has no output on any bus." The example of FIG. 3C results in a recall of about 100% and a precision of about 99%, and the example of FIG. 3D results in a recall of about 97-98% and a precision of about 95%. The recall and precision resultant from raw data versus latent states is comparably similar in these examples, whereas the amount of data transmitted downstream using latent states (i.e., compressed data) is significantly less than the amount of data transmitted downstream using raw data (e.g., over 1,900 kilobytes of raw data per fault message versus about 60 bytes of compressed data per fault message). The examples for latent states (FIGS. 3B and 3D) may be over a longer duration such that the size n of the sliding window in these examples is greater than n in the raw data examples of FIGS. 3A and 3C.

FIG. 4 is a flowchart illustrating various steps in a method 400. According to example implementations of the present disclosure, the method comprises executing a knowledge-based system 208 including an inference engine 210 and a knowledge base 212, and the inference engine may perform various steps of the method. As shown at block 402, the method includes receiving a time series of measurements of a plurality of operating conditions of a machine recorded during an operation of the machine. In some examples, receiving the time series of measurements further comprises receiving fault data from a vehicle system of the vehicle systems, recorded during the operation that is or includes a trip of the vehicle. The time series of measurements is clustered into one or more respective clusters of measurements, as shown at block 404. As shown at blocks 406 and 408, a pattern 218 is identified across the clusters of measurements, and a current state of the machine is defined that includes the pattern across the clusters of measurements.

The inference engine 210 accesses a knowledge base including a set of historical cases 222 describing historical problem states 224 of the machine and respective solutions 226, as shown at block 410. The historical problem states of the machine including patterns 230 across clusters of measurements of the plurality of operating conditions of the machine recorded during previous instances of operation of the machine during which failure modes of systems of the machine occurred. The respective solutions including repair actions 232 performed to address respective ones of the failure modes.

The inference engine 210 searches the knowledge base 212 for a historical case describing a respective solution to a historical problem state of the historical problem states 224 similar to the current state 220 (which may be the historical problem state most similar to the current state), as shown at block 412. In some examples, searching the knowledge base includes selecting the historical case having a highest weighted repair action and thereby a highest success rate of the repair actions of one or more of the historical cases in the set of historical cases 222. The respective solution being identified as a candidate solution to the current state, and the respective solution to the historical problem state including a repair action. The inference engine then generates an output display 236 indicating the repair action to address the current state, as shown at block 414.

In some examples, the method 300 further comprises diagnosing the current state 220 that is a failure mode of the vehicle system or another of the vehicle systems, from the fault data. Diagnosing the current state may include diagnosing a timing of the failure mode The method may also comprise identifying the plurality of operating conditions as related to the failure mode, identifying a time interval from the timing of the failure mode, and extracting the time series of measurements from a greater time series of measurements of the greater plurality of operating conditions, and for the time interval.

According to example implementations of the present disclosure, the system 200 and its subsystems including the source 202, AHM system 202a, and knowledge-based system 208 including the inference engine 210 and knowledge base 212 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Clause 1: An apparatus (500) comprising memory (504) configured to store computer-readable program code (506) for a knowledge-based system (208); and processing circuitry (502) configured to access the memory, and execute the computer-readable program code to cause an inference engine (210) to at least receive a time series of measurements of a plurality of operating conditions of a machine recorded during an operation of the machine; cluster the time series of measurements into one or more respective clusters of measurements; identify a pattern (218) across the clusters of measurements; define a current state (220) of the machine that includes the pattern across the clusters of measurements; access a knowledge base (212) including a set of historical cases (222) describing historical problem states (224) of the machine and respective solutions (226), the historical problem states of the machine including patterns (230) across clusters of measurements of the plurality of operating conditions of the machine recorded during previous instances of operation of the machine during which failure modes of systems of the machine occurred, and the respective solutions including repair actions (232) performed to address respective ones of the failure modes; search the knowledge base for a historical case describing a respective solution to a historical problem state of the historical problem states similar to the current state, the respective solution being identified as a candidate solution to the current state, the respective solution to the historical problem state including a repair action; and generate an output display (236) indicating the repair action (234) to address the current state.

Clause 2: The apparatus (500) of Clause 1, wherein the time series of measurements is clustered based on input parameters including a fixed number of clusters, a maximum distance between a center measurement and other measurements in a cluster of measurements, or a minimum number of measurements in a cluster of measurements.

Clause 3: The apparatus (500) of Clause 1 or 2, wherein the time series of measurements is clustered into a fixed number of clusters according to a clustering algorithm or a set of clustering algorithms including a k-means clustering algorithm, a Density Based Spatial Clustering of Applications with Noise (DB SCAN) algorithm, or a Dirichlet Process Gaussian Mixture Model (DPGMM) algorithm.

Clause 4: The apparatus (500) of any of Clauses 1-3, wherein the machine is a vehicle, the systems include vehicle systems, and the apparatus caused to receive the time series of measurements further comprises the apparatus caused to receive fault data from a vehicle system of the vehicle systems, recorded during the operation that is or includes a trip of the vehicle, and the processing circuitry (502) further executes the computer-readable program code (506) to cause the inference engine (210) and thereby the apparatus to diagnose the current state (220) that is a failure mode of the vehicle system or another of the vehicle systems, from the fault data.

Clause 5: The apparatus (500) of Clause 4, wherein the apparatus caused to diagnose the current state (220) includes the apparatus caused to diagnose a timing of the failure mode, and the apparatus is further caused to identify the plurality of operating conditions as related to the failure mode, wherein the plurality of operating conditions is a subset of a greater plurality of operating conditions of the vehicle; identify a time interval from the timing of the failure mode; and extract the time series of measurements from a greater time series of measurements of the greater plurality of operating conditions, and for the time interval.

Clause 6: The apparatus (500) of any of Clauses 1-5, wherein repair actions (232) in the knowledge base (212) are weighted based on a success rate of the repair actions to address the respective ones of the failure modes, and wherein one or more of the historical problem states (224) of one or more of the historical cases (222) match or are within a defined margin of matching the current state (220), and searching the knowledge base includes selecting the historical case having a highest weighted repair action and thereby a highest success rate of the repair actions of the one or more of the historical cases.

Clause 7: The apparatus (500) of any of Clauses 1-6, wherein the machine is an aircraft (204), and the current state (220) is indicated by a failure mode reported by the aircraft during the operation that is or includes a flight of the aircraft.

Clause 8: A method (400) comprising receiving (402) a time series of measurements of a plurality of operating conditions of a machine recorded during an operation of the machine; clustering (404) the time series of measurements into one or more respective clusters of measurements; identifying (406) a pattern (218) across the clusters of measurements; defining (408) a current state (220) of the machine that includes the pattern across the clusters of measurements; accessing (410) a knowledge base (212) including a set of historical cases (222) describing historical problem states (224) of the machine and respective solutions (226), the historical problem states of the machine including patterns (230) across clusters of measurements of the plurality of operating conditions of the machine recorded during previous instances of operation of the machine during which failure modes of systems of the machine occurred, and the respective solutions including repair actions (232)

performed to address respective ones of the failure modes; searching (412) the knowledge base for a historical case describing a respective solution to a historical problem state of the historical problem states similar to the current state, the respective solution being identified as a candidate solution to the current state, the respective solution to the historical problem state including a repair action; and generating (414) an output display (236) indicating the repair action (234) to address the current state.

Clause 9: The method (400) of Clause 8, wherein the time series of measurements is clustered based on input parameters including a fixed number of clusters, a maximum distance between a center measurement and other measurements in a cluster of measurements, or a minimum number of measurements in a cluster of measurements.

Clause 10: The method (400) of Clause 8 or 9, wherein the time series of measurements is clustered into a fixed number of clusters according to a clustering algorithm or a set of clustering algorithms including a k-means clustering algorithm, a Density Based Spatial Clustering of Applications with Noise (DB SCAN) algorithm, or a Dirichlet Process Gaussian Mixture Model (DPGMM) algorithm.

Clause 11: The method (400) of any of Clauses 8-10, wherein the machine is a vehicle, the systems include vehicle systems, and receiving the time series of measurements further comprises receiving fault data from a vehicle system of the vehicle systems, recorded during the operation that is or includes a trip of the vehicle, and wherein the method further comprises diagnosing the current state (220) that is a failure mode of the vehicle system or another of the vehicle systems, from the fault data.

Clause 12: The method (400) of Clause 11, wherein diagnosing the current state (220) includes diagnosing a timing of the failure mode, and the method further comprises identifying the plurality of operating conditions as related to the failure mode, wherein the plurality of operating conditions is a subset of a greater plurality of operating conditions of the vehicle; identifying a time interval from the timing of the failure mode; and extracting the time series of measurements from a greater time series of measurements of the greater plurality of operating conditions, and for the time interval.

Clause 13: The method (400) of any of Clauses 8-12, wherein repair actions (232) in the knowledge base (212) are weighted based on a success rate of the repair actions to address the respective ones of the failure modes, and wherein one or more of the historical problem states (224) of one or more of the historical cases (222) match or are within a defined margin of matching the current state (220), and searching the knowledge base includes selecting the historical case having a highest weighted repair action and thereby a highest success rate of the repair actions of the one or more of the historical cases.

Clause 14: The method (400) of any of Clauses 8-13, wherein the machine is an aircraft (204), and the current state (220) is indicated by a failure mode reported by the aircraft during the operation that is or includes a flight of the aircraft.

Clause 15: A computer-readable storage medium (504) comprising computer-readable program code (506) and a knowledge-based system (208) stored therein, the knowledge-based system including an inference engine (210) and a knowledge base (212), the computer readable program code, in response to execution by processing circuitry (502), causing the inference engine and thereby an apparatus (500) to at least receive a time series of measurements of a plurality of operating conditions of a machine recorded during an operation of the machine; cluster the time series of measurements into one or more respective clusters of measurements; identify a pattern (218) across the clusters of measurements; define a current state (220) of the machine that includes the pattern across the clusters of measurements; access the knowledge base including a set of historical cases (222) describing historical problem states (224) of the machine and respective solutions (226), the historical problem states of the machine including patterns (230) across clusters of measurements of the plurality of operating conditions of the machine recorded during previous instances of operation of the machine during which failure modes of systems of the machine occurred, and the respective solutions including repair actions (232) performed to address respective ones of the failure modes; search the knowledge base for a historical case describing a respective solution to a historical problem state of the historical problem states similar to the current state, the respective solution being identified as a candidate solution to the current state, the respective solution to the historical problem state including a repair action; and generate an output display (236) indicating the repair action (234) to address the current state.

Clause 16: The computer-readable storage medium (504) of Clause 15, wherein the time series of measurements is clustered based on input parameters including a fixed number of clusters, a maximum distance between a center measurement and other measurements in a cluster of measurements, or a minimum number of measurements in a cluster of measurements.

Clause 17: The computer-readable storage medium (504) of Clause 15 or 16, wherein the time series of measurements is clustered into a fixed number of clusters according to a clustering algorithm or a set of clustering algorithms including a k-means clustering algorithm, a Density Based Spatial Clustering of Applications with Noise (DBSCAN) algorithm, or a Dirichlet Process Gaussian Mixture Model (DPGMM) algorithm.

Clause 18: The computer-readable storage medium (504) of any of Clauses 15-17, wherein the machine is a vehicle, the systems include vehicle systems, and the apparatus (500) caused to receive the time series of measurements further comprises the apparatus caused to receive fault data from a vehicle system of the vehicle systems, recorded during the operation that is or includes a trip of the vehicle, and wherein the apparatus is further caused to diagnose the current state (220) that is a failure mode of the vehicle system or another of the vehicle systems, from the fault data.

Clause 19: The computer-readable storage medium (504) of Clause 18, wherein the apparatus caused to diagnose the current state (220) includes the apparatus (500) caused to diagnose a timing of the failure mode, and the apparatus is further caused to identify the plurality of operating conditions as related to the failure mode, wherein the plurality of operating conditions is a subset of a greater plurality of operating conditions of the vehicle; identify a time interval from the timing of the failure mode; and extract the time series of measurements from a greater time series of measurements of the greater plurality of operating conditions, and for the time interval.

Clause 20: The computer-readable storage medium (504) of any of Clauses 15-19, wherein repair actions (232) in the knowledge base (212) are weighted based on a success rate of the repair actions to address the respective ones of the failure modes, and wherein one or more of the historical problem states (224) of one or more of the historical cases (222) match or are within a defined margin of matching the current state (220), and the apparatus (500) caused to search the knowledge base includes the apparatus caused to select the historical case having a highest weighted repair action and thereby a highest success rate of the repair actions of the one or more of the historical cases.

Clause 21: The computer-readable storage medium (504) of any of Clauses 15-20, wherein the machine is an aircraft (204), and the current state (220) is indicated by a failure mode reported by the aircraft during the operation that is or includes a flight of the aircraft.

What is claimed is:

1. An apparatus for automating prediction of a repair for an aircraft, the apparatus comprising:
    a communications device mounted to the aircraft and configured to communicate with an aircraft sensor device monitoring an electrical, hydraulic, or propulsion aircraft operating system of the aircraft;
    a memory device mounted to the aircraft and configured to store computer-readable program code for a knowledge-based system including an inference engine and a knowledge base; and
    a processing circuit mounted to the aircraft and configured to access the memory device and execute the computer-readable program code to cause the inference engine and thereby the apparatus to:
        receive, via the communications device from the aircraft sensor device monitoring the aircraft operating system, a time series of measurements of a plurality of real-time operating conditions of the aircraft recorded during a flight operation of the aircraft;
        cluster the time series of measurements into respective clusters of measurements;
        identify a pattern across the clusters of measurements, including:
            compressing sensor data points in the time series of measurements to form compressed data, wherein the compression is based on:
                computing a distance between a data point of the sensor data points and a cluster state that represents a mean value of data points in a cluster of a plurality of clusters of the clusters of measurements, and
                assigning the cluster state to the data point based on determining that the computed distance between the data point and the state is the shortest from a set of distances computed between the data point and cluster states of the plurality of clusters, and
            sequencing latent states for the compressed data computed for n seconds in a sliding window;
        define a current state of the aircraft that includes the pattern across the clusters of measurements;
        access the knowledge base including a set of historical cases describing historical problem states of the aircraft and respective solutions, the historical problem states of the aircraft including patterns across clusters of measurements of the plurality of operating conditions of the aircraft recorded during previous instances of operation of the aircraft during which failure modes of the aircraft operating systems of the aircraft occurred, and the respective solutions including repair actions performed to address respective ones of the failure modes;
        identify, by searching the knowledge base, a historical case describing a respective solution to a historical problem state of the historical problem states similar to the current state, the respective solution being identified as a candidate solution to the current state, the respective solution to the historical problem state including a repair action; and
        generate an output display indicating the repair action to address the current state.

2. The apparatus of claim 1, wherein clustering the time series of measurements is further based on input parameters including a fixed number of clusters.

3. The apparatus of claim 1, wherein the time series of measurements is clustered into a fixed number of clusters according to a clustering algorithm or a set of clustering algorithms including a k-means clustering algorithm, a Density Based Spatial Clustering of Applications with Noise (DBSCAN) algorithm, or a Dirichlet Process Gaussian Mixture Model (DPGMM) algorithm.

4. The apparatus of claim 1, wherein the time series of measurements comprises fault data from a vehicle system of the vehicle systems recorded during the flight operation that is or includes a trip of the vehicle, and
    wherein the processing circuit further causes the apparatus to diagnose the current state that is a failure mode of the vehicle system or another of the vehicle systems from the fault data.

5. The apparatus of claim 4, wherein defining the current state of the aircraft includes the apparatus diagnosing a timing of the failure mode, and wherein the apparatus is further caused to:
    identify the plurality of operating conditions as related to the failure mode, wherein the plurality of operating conditions is a subset of a greater plurality of operating conditions of the vehicle;
    identify a time interval from the timing of the failure mode; and
    extract the time series of measurements from a greater time series of measurements of the greater plurality of operating conditions, and for the time interval.

6. The apparatus of claim 1, wherein the repair actions in the knowledge base are weighted based on a success rate of the repair actions to address the respective ones of the failure modes,
    wherein one or more of the historical problem states of one or more of the historical cases match or are within a defined margin of matching the current state, and
    wherein searching the knowledge base includes selecting the historical case having a highest weighted repair action and thereby a highest success rate of the repair actions of the one or more of the historical cases.

7. The apparatus of claim 1, wherein the current state is indicated by a failure mode reported by the aircraft during the flight operation that is or includes a flight of the aircraft.

8. A method for automating prediction of a repair for an aircraft, the method comprising:
    receiving, via a communications device mounted to the aircraft from an aircraft sensor device monitoring an electrical, hydraulic, or propulsion aircraft operating system of the aircraft, a time series of measurements of a plurality of operating conditions of the aircraft recorded during a flight operation of the aircraft;
    clustering, via a processing circuit mounted to the aircraft, the time series of measurements into respective clusters of measurements;
    identifying, via the processing circuit, a pattern across the clusters of measurements, including:
        compressing sensor data points in the time series of measurements to form compressed data, wherein the compression is based on:
            computing a distance between a data point of the sensor data points and a cluster state that represents a mean value of data points in a cluster of a plurality of clusters of the clusters of measurements, and assigning the cluster state to the data point based on determining that the computed distance between the data point and the state is the shortest from a set of distances computed between the data point and cluster states of the plurality of clusters, and sequencing latent states for the compressed data computed for n seconds in a sliding window;

defining, via the processing circuit, a current state of the aircraft that includes the pattern across the clusters of measurements;

accessing, via the processing circuit, a knowledge base including a set of historical cases describing historical problem states of the aircraft and respective solutions, the historical problem states of the aircraft including patterns across clusters of measurements of the plurality of operating conditions of the aircraft recorded during previous instances of operation of the aircraft during which failure modes of the aircraft operating systems of the aircraft occurred, and the respective solutions including repair actions performed to address respective ones of the failure modes;

identifying, via the processing circuit searching the knowledge base, a historical case describing a respective solution to a historical problem state of the historical problem states similar to the current state, the respective solution being identified as a candidate solution to the current state, the respective solution to the historical problem state including a repair action; and generating an output display indicating the repair action to address the current state.

9. The method of claim 8, wherein clustering the time series of measurements is further based on input parameters including a fixed number of clusters.

10. The method of claim 8, wherein the time series of measurements is clustered into a fixed number of clusters according to a clustering algorithm or a set of clustering algorithms including a k-means clustering algorithm, a Density Based Spatial Clustering of Applications with Noise (DBSCAN) algorithm, or a Dirichlet Process Gaussian Mixture Model (DPGMM) algorithm.

11. The method of claim 8, wherein the time series of measurements comprises fault data from a vehicle system of the vehicle systems recorded during the flight operation that is or includes a trip of the vehicle, and wherein the method further comprises diagnosing the current state that is a failure mode of the vehicle system or another of the vehicle systems from the fault data.

12. The method of claim 11, wherein defining the current state of the aircraft includes diagnosing a timing of the failure mode, and wherein the method further comprises:

identifying the plurality of operating conditions as related to the failure mode, wherein the plurality of operating conditions is a subset of a greater plurality of operating conditions of the vehicle;

identifying a time interval from the timing of the failure mode; and extracting the time series of measurements from a greater time series of measurements of the greater plurality of operating conditions, and for the time interval.

13. The method of claim 8, wherein the repair actions in the knowledge base are weighted based on a success rate of the repair actions to address the respective ones of the failure modes, wherein one or more of the historical problem states of one or more of the historical cases match or are within a defined margin of matching the current state, and wherein searching the knowledge base includes selecting the historical case having a highest weighted repair action and thereby a highest success rate of the repair actions of the one or more of the historical cases.

14. The method of claim 8, wherein the current state is indicated by a failure mode reported by the aircraft during the flight operation that is or includes a flight of the aircraft.

15. A computer-readable storage medium comprising:

computer-readable program code and a knowledge-based system stored therein, the knowledge-based system including an inference engine and a knowledge base, the computer-readable program code, in response to execution by processing circuitry, causing the inference engine and thereby an apparatus mounted to an aircraft to:

receive, via a communications device mounted to the aircraft from an aircraft sensor device monitoring an electrical, hydraulic, or propulsion aircraft operating system of the aircraft, a time series of measurements of a plurality of operating conditions of the aircraft recorded during a flight operation of the aircraft;

cluster the time series of measurements into respective clusters of measurements;

identify a pattern across the clusters of measurements, including:

compressing sensor data points in the time series of measurements to form compressed data, wherein the compression is based on:

computing a distance between a data point of the sensor data points and a cluster state that represents a mean value of data points in a cluster of a plurality of clusters of the clusters of measurements, and assigning the cluster state to the data point based on determining that the computed distance between the data point and the state is the shortest from a set of distances computed between the data point and cluster states of the plurality of clusters, and sequencing latent states for the compressed data computed for n seconds in a sliding window;

define a current state of the aircraft that includes the pattern across the clusters of measurements;

access the knowledge base including a set of historical cases describing historical problem states of the aircraft and respective solutions, the historical problem states of the aircraft including patterns across clusters of measurements of the plurality of operating conditions of the aircraft recorded during previous instances of operation of the aircraft during which failure modes of the aircraft operating systems of the aircraft occurred, and the respective solutions including repair actions performed to address respective ones of the failure modes;

identify, by searching the knowledge base, a historical case describing a respective solution to a historical problem state of the historical problem states similar to the current state, the respective solution being identified as a candidate solution to the current state, the respective solution to the historical problem state including a repair action; and generate an output display indicating the repair action to address the current state.

16. The computer-readable storage medium of claim 15, wherein clustering the time series of measurements is further based on input parameters including a fixed number of clusters.

17. The computer-readable storage medium of claim 15, wherein the time series of measurements is clustered into a fixed number of clusters according to a clustering algorithm or a set of clustering algorithms including a k-means clustering algorithm, a Density Based Spatial Clustering of Applications with Noise (DBSCAN) algorithm, or a Dirichlet Process Gaussian Mixture Model (DPGMM) algorithm.

18. The computer-readable storage medium of claim 15, wherein the time series of measurements comprises fault data from a vehicle system of the vehicle systems recorded during the flight operation that is or includes a trip of the vehicle, and wherein the apparatus is further caused to diagnose the current state that is a failure mode of the vehicle system or another of the vehicle systems from the fault data.

19. The computer-readable storage medium of claim 18, wherein defining the current state of the aircraft includes diagnosing a timing of the failure mode, and wherein the apparatus is further caused to:
    identify the plurality of operating conditions as related to the failure mode, wherein the plurality of operating conditions is a subset of a greater plurality of operating conditions of the vehicle;
    identify a time interval from the timing of the failure mode; and
    extract the time series of measurements from a greater time series of measurements of the greater plurality of operating conditions, and for the time interval.

20. The computer-readable storage medium of claim 15, wherein the repair actions in the knowledge base are weighted based on a success rate of the repair actions to address the respective ones of the failure modes, wherein one or more of the historical problem states of one or more of the historical cases match or are within a defined margin of matching the current state, and wherein the apparatus caused to search the knowledge base includes the apparatus caused to select the historical case having a highest weighted repair action and thereby a highest success rate of the repair actions of the one or more of the historical cases.

* * * * *